Figure 3:
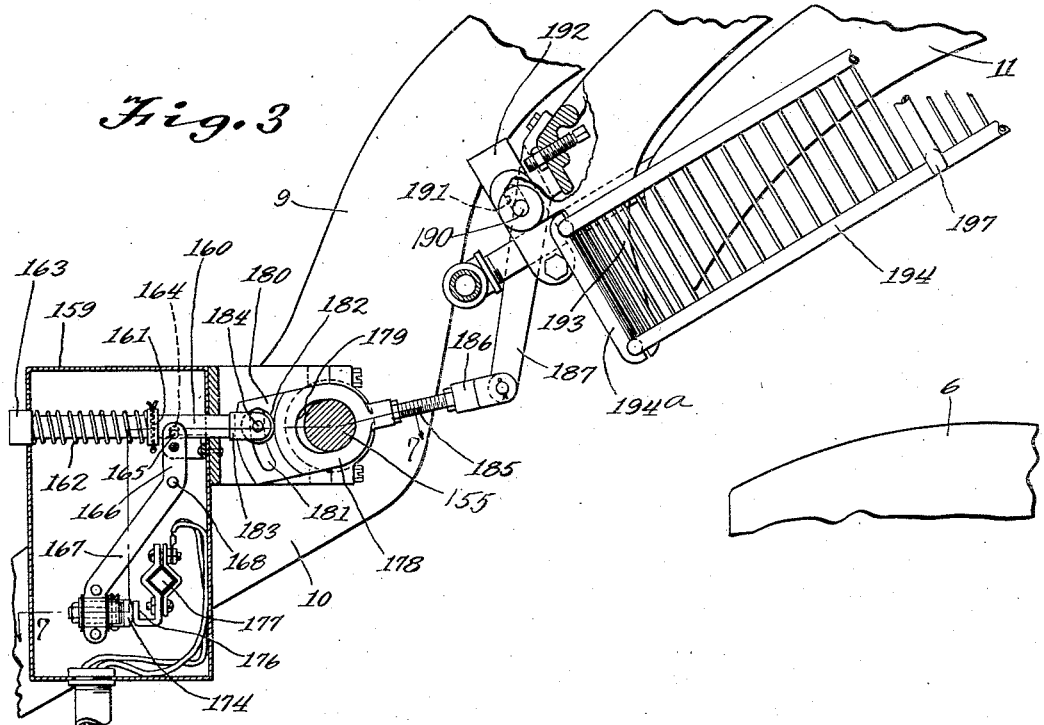

Dec. 17, 1929.      J. P. SINGISER      1,740,045
POWER OPERATED PRESSING MACHINE
Filed July 26, 1923      5 Sheets-Sheet 1
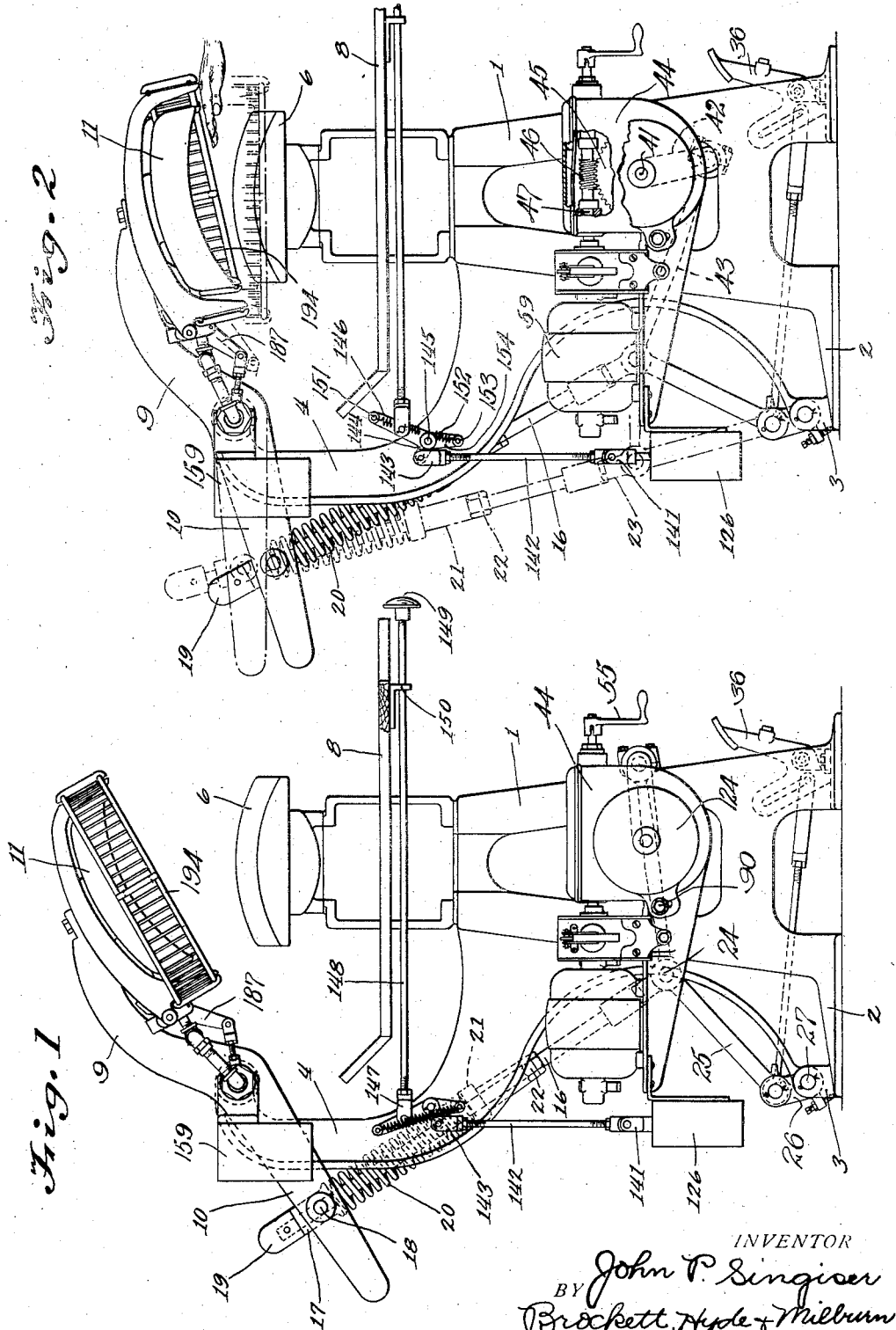
INVENTOR
John P. Singiser
BY
Brockett, Hyde & Milburn
ATTORNEYS Dec. 17, 1929. J. P. SINGISER 1,740,045
POWER OPERATED PRESSING MACHINE
Filed July 26, 1923   5 Sheets-Sheet 2

INVENTOR
John P. Singiser
BY Brockett, Hyde & Milburn
ATTORNEYS

Dec. 17, 1929.   J. P. SINGISER   1,740,045
POWER OPERATED PRESSING MACHINE
Filed July 26, 1923   5 Sheets-Sheet 3

INVENTOR
John P. Singiser
BY
Brockett, Hyde & Milburn
ATTORNEYS

Dec. 17, 1929.  J. P. SINGISER  1,740,045
POWER OPERATED PRESSING MACHINE
Filed July 26, 1923   5 Sheets-Sheet 4
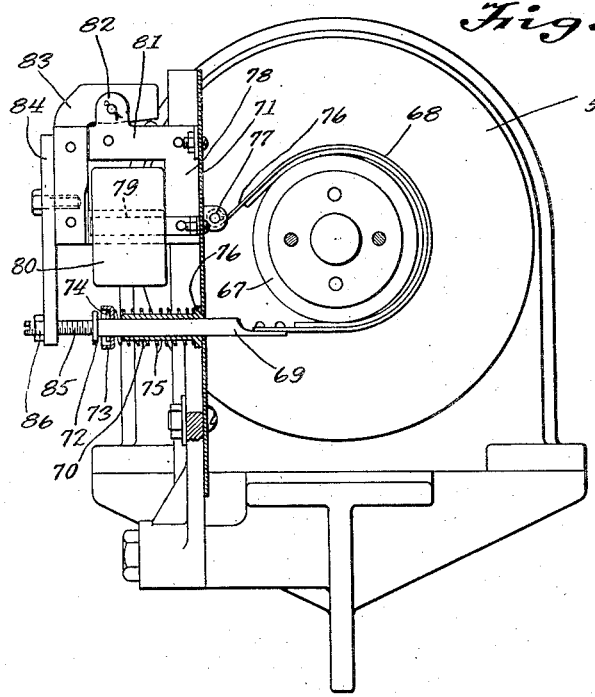
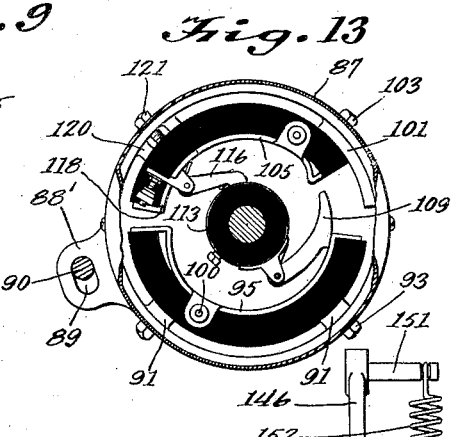
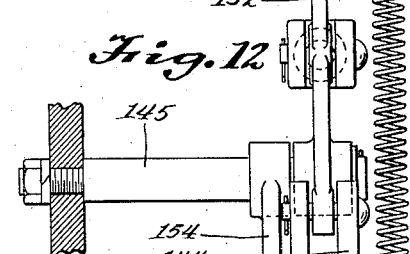
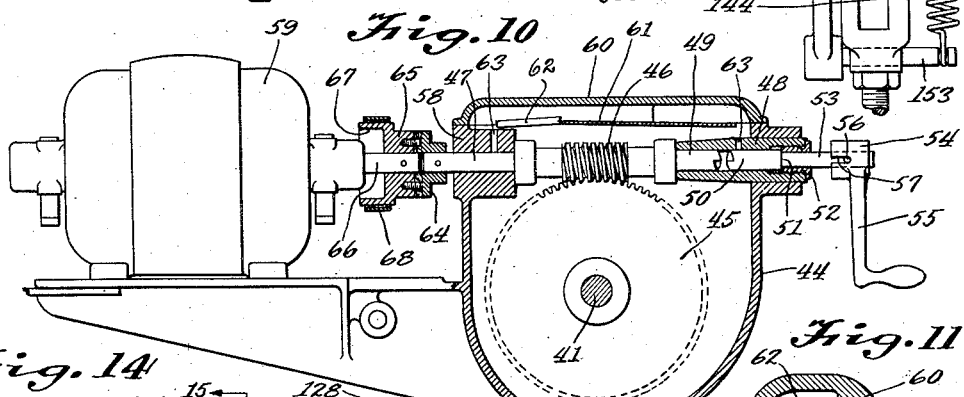
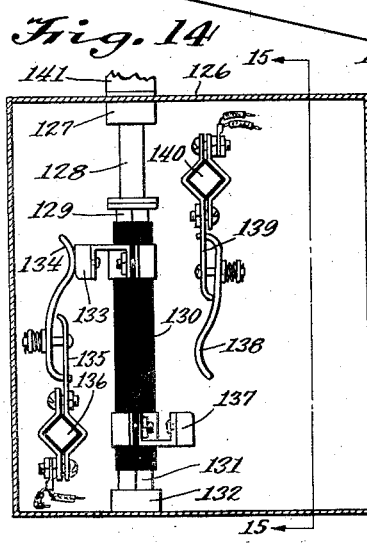
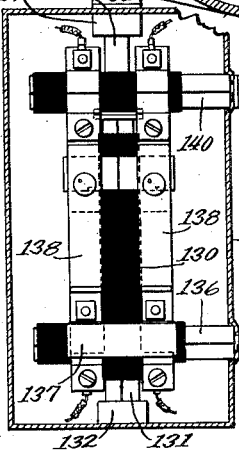
INVENTOR
John P. Singiser
BY Brockett, Hyde & Milburn
ATTORNEYS Dec. 17, 1929. J. P. SINGISER 1,740,045
POWER OPERATED PRESSING MACHINE
Filed July 26, 1923  5 Sheets-Sheet 5
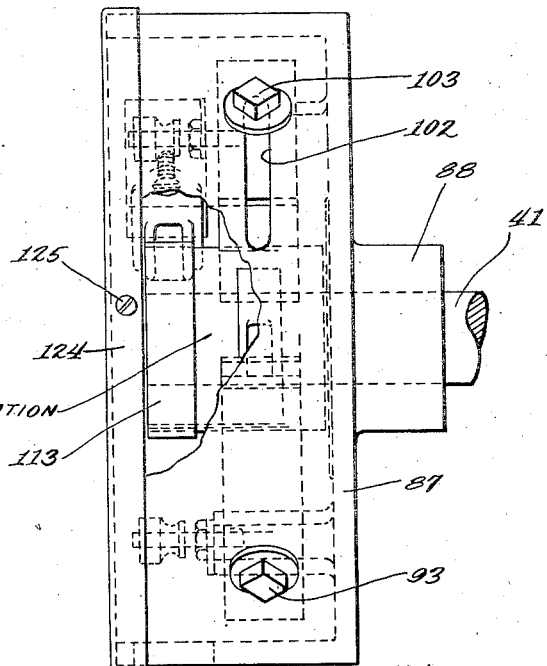
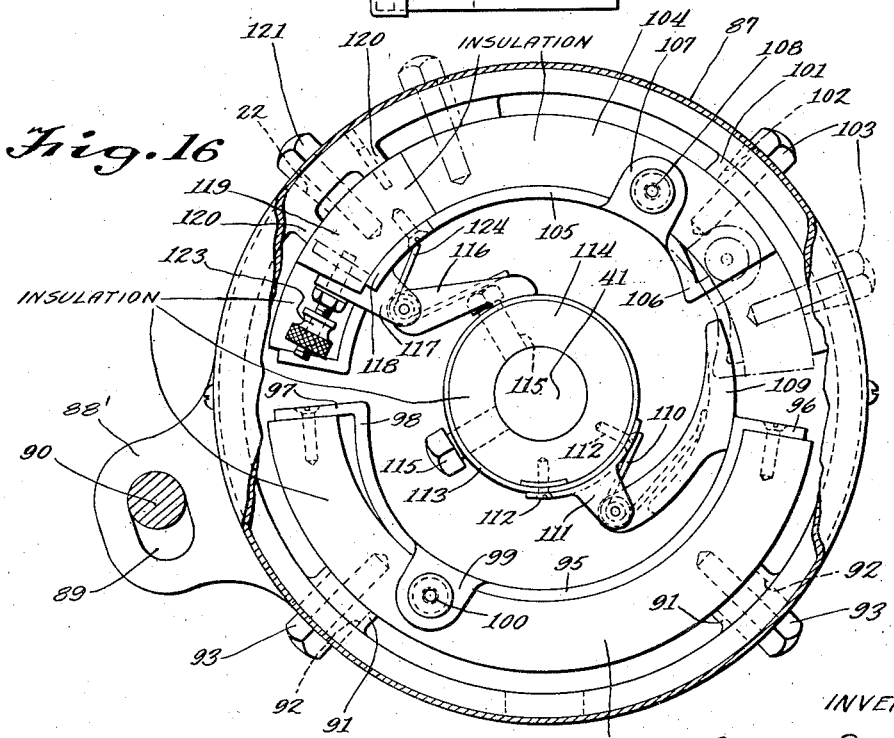
INVENTOR
John P. Singiser
BY Brockett, Hyde + Milburn
ATTORNEYS Patented Dec. 17, 1929

1,740,045

UNITED STATES PATENT OFFICE

JOHN P. SINGISER, OF CHICAGO, ILLINOIS, ASSIGNOR TO THE AMERICAN LAUNDRY MACHINERY COMPANY, OF CINCINNATI, OHIO, A CORPORATION OF OHIO

POWER-OPERATED PRESSING MACHINE

Application filed July 26, 1923. Serial No. 653,931.

This invention relates to garment presses and particularly to machines of this type employing relatively large head and buck structures manipulated by power for producing the pressing operation.

Machines of this type are utilized in pressing laundered articles and garments generally in lays, so as to speak, this expression meaning that the article or garment is laid upon the bed or buck in the proper position to be finished or pressed and thereafter the finish or press is set in the goods by the pressure of the head in the presence of heat and sometimes moisture. One fact to be borne in mind in connection with the use of these machines is that they must properly finish the garment in the shortest possible time and with minimum effort or exertion on the part of the operator. In many instances, these machines are used by operators who are doing piecework or are under a task so that the problem is one of production, the operator or user being only interested in the number of properly finished pieces that can be turned out upon the machine.

Heretofore, most of these machines have been treadle operated accompanied by a later power operation but even here it has been found that the raising of the foot and leg of the operator for the treadle operation and the labor incident to producing even the closing of the press are all performed at the expense of production yielded by the machine. In many instances, these machines, in their various fields of application, are operated by girls and it has been found that this type of foot and arm operation is extremely injurious to their health.

In addition to the foregoing, there are two other factors which might be said to control the development of this type of machine. One is the protection of the operator against injury due to accident, such for example, as the crushing of the hands between the pressing members. The other is the protection of the machine against damage, due to its improper operation on the part of the operator, because it must be borne in mind that, as before stated, the operator is interested only in the number of pieces the machine will properly finish and is not interested and does not have, or at least, does not take, the time to see to it that he is protected against injury and that the machine is not damaged or thrown out of step in use.

With the foregoing in mind, the present invention is what might be termed a no-treadle, power actuated type of garment press. It comprises a frame supporting the bed or buck and a swinging press head cooperating therewith, together with link and lever mechanism including toggles actuated by power means controlled by an operator's selective control for the opening and closing operations. An emergency control adapted for actuation by the hand or arm of the operator is provided so that when the hand or arm is between the pressing members, the motor means is stopped and injury to the operator is avoided. Additional controlling mechanism is also provided for protecting the machine against improper operation, said mechanism maintaining the machine in proper cycle and preventing overrunning of the mechanism in producing the closing and opening movements. The press of this invention also includes an emergency opening device for preventing accidents such as the burning of a piece locked in the press against opening by the usual control. This device is in the form of a treadle normally out of any obstructing position with respect to the operator but arranged to effectively and quickly release the pressing members from engagement. The machine is also provided with manually operable means, such as a crank, for rotating the parts in cycle to open or close the machine for any purpose, such as for timing, adjustment, etc.

Other features of the invention will in part be brought out and in part will be obvious from the details set forth in the following description, drawings and claims.

Figure 4:
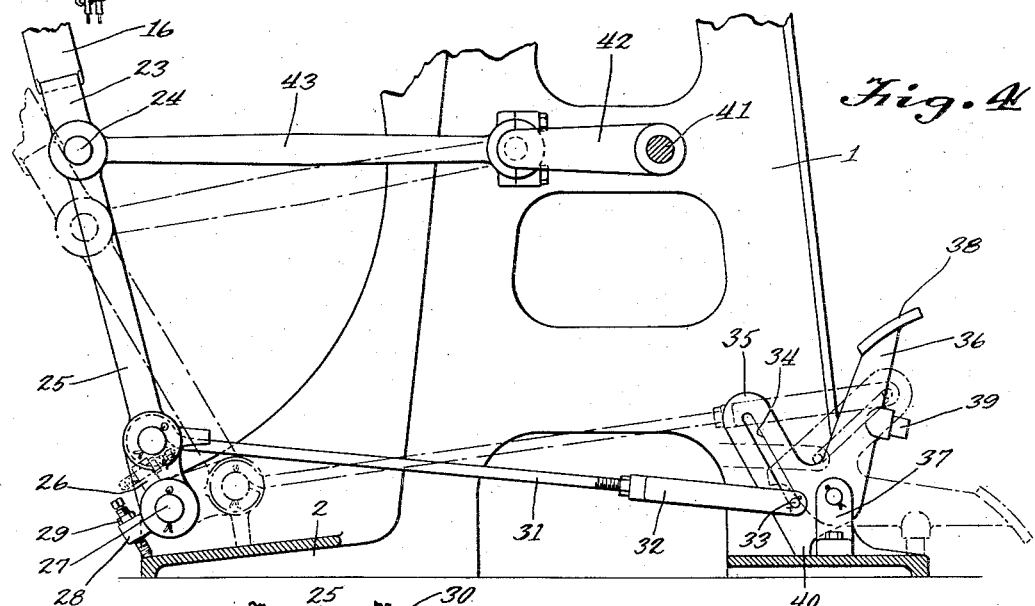
Figure 5:
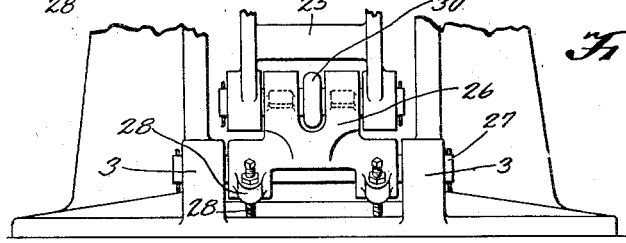
Figure 6:
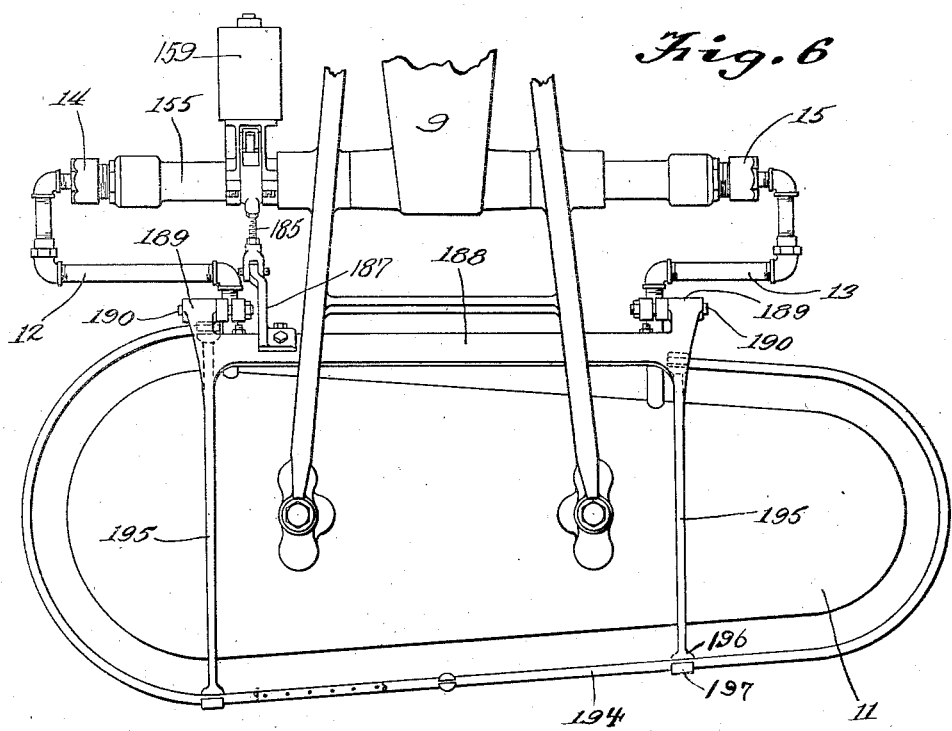
Figure 7:
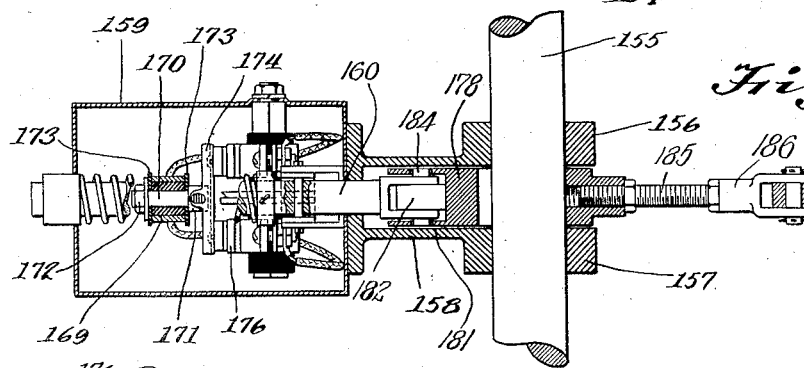
Figure 8:
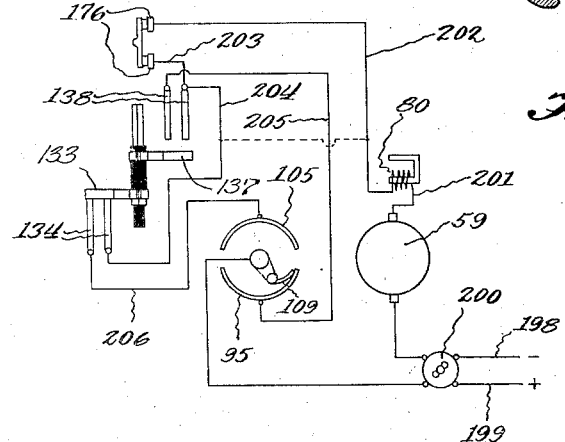

Referring to the drawings, Fig. 1 is a side elevation of the machine open and ready for use; Fig. 2 is a similar view with the machine partially closed, the head or upper pressing member being arrested in its closing movement by the emergency control mechanism, due to the presence of the operator's hand between the pressing members; Fig. 3 is an enlarged detail view of the emergency control mechanism; Fig. 4 is an enlarged view of the lower part of the frame with the accompanying parts to clearly disclose the emergency release mechanism; Fig. 5 is a rear view of the lower part of the mechanism shown in Fig. 4; Fig. 6 is a top plan view of the head and its associated parts; Fig. 7 is a horizontal sectional view of the emergency control mechanism, taken upon the line 7—7, Fig. 3; Fig. 8 is a wiring diagram; Fig. 9 is a detail view showing the electric brake; Fig. 10 is a view of the power drive and the hand crank mechanism for manipulating the same; Fig. 11 is a detail section of the upper portion of the gear housing, shown in Fig. 10; Fig. 12 is a rear elevation of the main switch control for opening and closing the press; Fig. 13 is a view partly broken away showing the commutator mechanism for setting up the parts of the opening and closing cycle; Fig. 14 is a view in elevation with the casing broken away showing the main switch control; Fig. 15 is a similar view, taken on the line 15—15, Fig. 14; Fig. 16 is a view similar to Fig. 13 showing the commutator switch in side elevation with the casing broken away, and Fig. 17 is an end elevation thereof.

In the specific embodiment shown in the drawings, 1 represents the main frame or standard provided with a rearwardly extending base portion 2 having upwardly extending, spaced webs providing ears 3. These webs extend upwardly along the back of the main frame or standard and merge into an upwardly and rearwardly extending arm 4 with a forwardly extending bearing portion. Mounted upon the main frame or standard 1 is a buck or garment support 6 having its upper surface provided with suitable padding, said surface lying in substantially a horizontal plane through the axis of the bearing portion. Suitably secured to the buck is a work-table 8, as is usual in machines of this type. Mounted in the bearing portion is a head lever 9, comprising side lever members provided with rear extensions 10. The head lever has at its forward end a press head 11 adapted when swung downward to seat upon the padding of the buck. The pressing face of the head may be finished with a polished surface or may be covered with cloth, as required by the class of work to be treated.

The head or upper pressing member 11 is heated by steam or other heating medium supplied through the pipes 12 and 13 which are connected with swivelled return and supply connections 14 and 15. The buck or lower pressing member is also steam heated in any suitable manner common to the art.

The operating mechanism for the head is of the toggle type and comprises an upper main toggle link consisting of a rod 16 extending through a clevis member 17 provided with trunnions 18 engaging in the rear extensions 10 of the head lever 9. The upper end of this rod is provided with a cap 19 engaging member 17. Below the rear lever extensions 10 rod 16 is provided with a spring 20, the lower end of which engages an adjustable thrust collar 21 held in any adjusted position on rod 16 by a nut 22. The lower end of this rod is provided with a clevis 23, which is pivotally connected at 24 to the upper end of a toggle link 25. The lower end of link 25 is pivoted to the upper end of a relatively small toggle link 26, the lower end of which is pivotally mounted on a rod 27 secured in ears 3 of the frame. Said link 26 is provided with rearwardly extending ears 28 for receiving adjusting screws 29 adapted to engage the frame, as shown in Fig. 4, so as to support link 26 in straight line position with respect to the main toggle links 16 and 25 when straightened.

The upper end of link 26 is bifurcated to receive an eye 30 formed on the end of a pull rod 31 provided at its forward end with a clevis 32 threaded to the rod so that it may be readily adjusted thereon. Clevis 32 is provided with a pin 33 engaging in a slot 34 in the arm 35 of the emergency treadle 36 mounted in a suitable bracket 37 secured to the base of the machine. This treadle is provided with a foot plate 38 and suitable stops 39 and 40 to limit forward and rearward movement of the treadle, respectively. When the press is closed, as shown in Fig. 4, the arm 35 of the release treadle inclines rearwardly, with the pin 33 at the bottom of the slot therein. It will be seen from the foregoing description of the emergency treadle and its connection to the toggle link 26 that any tendency of this link to move forward is prevented on account of the pin 33 being at the bottom of the slot 34 and below the pivot of the treadle, so that any tendency toward movement of the emergency treadle tends to cause its rear stop portion 40 to engage the base and there is no tendency to rock it in the opposite direction or toward release position.

This release treadle 36 is only used in case of emergency, as when a garment is locked in the machine due to the failure of the machine to open by the usual control, but it is readily operable whenever necessary by the operator depressing the foot plate and moving the toggle from the position shown in full lines in Fig. 4 to that shown in dotted lines. When this toggle is moved in this manner, the head is released and moves upwardly a considerable distance from the bed or buck so that the work being treated may be readily withdrawn.

Supported in the main frame 1 of the machine and in substantially a horizontal plane with the path of movement of the pivotal point 24 of the main toggle is the main operating shaft 41. This shaft is provided with a crank arm 42 pivotally connected to an operating toggle link 43 which in turn is pivotally connected at its rear end to the main toggle links 16 and 25 at the pivot point 24. It is obvious that when this crank arm is rotated from the full line position shown in Fig. 4 to the position shown in Fig. 1, the press head 11 will be raised, the reverse operation producing closing movement of the head. The straightening of the main toggle and the toggle formed by the crank arm 42 and the link 43 produce pressure upon the work.

While the shaft 41 may be operated by any suitable means, it is here shown as rotated by motor means, comprising a gear housing 44 enclosing a worm wheel 45 mounted upon the main operating shaft 41 and engaging a worm 46 arranged upon a power shaft 47. The forward end of this power shaft is mounted in a relatively long bearing 48 within which the shaft terminates in an end clutch member 49. Within this bearing is a co-operating end clutch member 50 provided with a shoulder 51 engaged by a thrust sleeve 52 threaded in said bearing. Projecting out at the front of the housing is an operating shaft portion 53, which is adapted to receive the hub 54 of a hand crank 55, the outer end of said shaft portion 53 being provided with a pin 56, which is adapted to engage in an open-ended slot 57 in the hub of the crank. It will thus be seen that the operator, if he desires, may place the hand crank upon the shaft portion 53 with the slot 57 receiving the pin 56 and move said shaft portion inwardly until the end clutch members 49, 50 engage, whereupon the power shaft 47 and the worm wheel 45 may be operated. This arrangement is provided for any purpose but is especially useful in timing and setting the press. The rear end of the power shaft extends through a suitable bearing 58 and is driven by a motor 59 as will later appear. The housing 44 is provided with a suitable cover 60, to the inner surface of which is secured an inclined shedding plate 61 arranged above the bearings 48, 58 and provided with an edge lip 62. This plate collects the oil thrown into the upper part of the housing and directs it to suitable openings 63 in the bearings.

The power shaft 47, is provided at its rear end with a coupling member 64 co-operating with a coupling member 65 mounted upon a motor shaft 66 driven by the motor 59. The coupling member 65 is provided with a brake drum 67 adapted to be engaged by a friction band 68 surrounding the drum and having one of its ends connected to a rod 69 passing loosely through a bearing 70 in a suitable support 71. The rod 69 extends beyond the bearing 70 and is provided at its end with a suitable head 72. The rod is also provided with a thrust washer 73 engaging a pin 74 passing through the shaft, said thrust washer in turn being engaged by a spring 75 surrounding the bearing 70 and engaging a flange 76 thereof at its other end. The spring 75 tends to move the rod 69 to the left, as shown in Fig. 9, and pull upon the end of the brake band. This operation tightens the band about the brake drum 67, due to the fact that the opposite end 76 of the brake band is secured at 77 to the support 71. In other words, the brake is normally set upon the motor shaft by the spring 75.

Suitable electro-magnetic means is provided for releasing the brake, said means comprising a laminated U-shaped frame 78 having one of its legs 79 surrounded by a coil 80. Pivoted to the other leg 81, such as to the ears 82 thereof, is an armature 83 which laps both legs of the frame. Secured to the armature is an arm 84 in the lower end of which is threaded a set screw 85, said screw being held in any adjusted position by a check nut 86. This set screw is adapted to engage the head 72 on the end of rod 69 and release the brake band from the brake drum 67, which is the position of the parts illustrated in Fig. 9. This release of the brake is brought about by the coil 80 being included in the operating circuits of the motor, as will later appear.

The motor 59 is governed in its operation by three controlling devices, a timer for properly timing the parts of the cycle, an operator-operated main line switch for closing the circuit through the timer to start and stop the machine for the normal operation, and an emergency controlling device also in the circuit and responsive in its action to the operator's hand or arm between the pressing members. The latter device serves to break the circuit during closing movement of the press and arrest the head before injury can result to the operator.

The timing mechanism comprises a stationary cylindrical casing 87 provided with a hub 88 loosely mounted upon the shaft 41 outside of the gear housing 44. The casing 87 is provided with a radially extending ear 88' having a circumferentially extending slot 89 for receiving the shank of a clamping screw or stud 90 secured to the housing. This arrangement of stud and slot enables the entire casing 87 to be adjusted about the shaft 41 in making a change in the adjustment of the cycle as will more fully appear.

Extending inwardly from the lower half of the casing 87 are spacing lugs 91 and through the wall of the casing and these lugs are suitable slots 92. Extending through these slots are suitable screws or bolts 93 threaded into a concentric insulating segment 94, which is slightly less than half circular and is provided upon its entire inner face with a contact 95. This contact has one end portion 96 secured to one end of the segment and its other end portion 97 secured to the opposite end. At this latter point the contact is slightly eccentric, as at 98, or in other words, is curved inwardly, as clearly shown in Figs. 13 and 16. The contact is further provided intermediate its ends with an ear 99 provided with a binding post 100, to which is attached one of the leads (not shown) of the motor circuit. The upper half of casing 87 is provided with spacing lugs 101 which are longer than the lugs 91 and these lugs and the adjacent casing wall are also provided with slots 102 through which extend screws or bolts 103 threaded into an insulating segment 104. This latter insulating segment, which is less in extent than the segment 94, is also provided with a coextensive contact strip 105 secured thereto in a similar manner, said contact strip 105 being also provided at one end with an inwardly inclined or curved portion 106. This contact is also provided with an ear 107 and binding post 108. These two contact segments are in the same plane through the axis of the casing and are engaged by a contact shoe 109 normally forced outwardly by a suitable spring 110. Said contact shoe is pivotally mounted in ears 111 secured by means of screws 112 to a conducting ring 113 secured around an insulating hub 114, which in turn is secured to the shaft 41 by suitable set screws 115. The insulating hub 114 and the conducting ring 113 extend out of the plane of the contact segments 94 and 104.

The insulating hub 114 and the conducting ring 113 extend beyond the plane of the circumferential contacts and the contact shoe 116 is pivotally mounted in ears 117 carried by a plate 118 secured to an insulating block 119, which is held in place against spacing lugs 120, on the inside of the casing 79, by a screw 121 which passes through a slot 122 in the casing. The plate 118 has an extension on the end of the block 119 and this extension is provided with a binding post 123. A spring 124 forces the stationary contact shoe 116 into engagement with the ring 113. The casing 87 is closed by a suitable cover 124 held in place by suitable screws 125.

It will be seen from the foregoing that as the shaft 41 rotates with the opening and closing movement of the press the hub 114 with its conducting ring and with the contact shoe will be revolved in the casing causing the shoe to travel from one segment to the other, the curved ends of the segments causing the contact shoe 109 to snap off of the particular segment with which it is in engagement and thereby quickly break the circuit and prevent arcing. This is extremely desirable for the power stroke which is the stroke utilizing the lower contact segment. At the same time the stationary contact shoe 116 is in engagement with the conducting ring 113 and thereby transmitting current to the movable shoe 109. The particular arrangement of electrical circuits and the function of this device in such circuits will be more fully set forth in the wiring diagram later to be explained.

The adjustable arrangement of the insulating blocks in the casing, as illustrated in dotted lines, Fig. 16 enables them to be shifted circumferentiallly within the casing so as to time them accurately with respect to the opening and closing parts of the cycle, whereas the adjustment of the casing 87, through the slot and pin arrangement 89, 90, permits the entire timing device to be shifted as a unit about shaft 41 for any desired adjustment.

The operator-operated main line switch is arranged in a substantially rectangular casing 126 which is provided with an upper bearing 127 for a push rod 128 having a squared portion 129 receiving a relatively long insulating tube 130. The squared portion 129 is hollow and telescope onto a squared portion 131 forming a part of a boss 132 secured to the bottom of the casing 126 and in alignment with the bearing 127. Clamped to the insulating tube 130 is a bridging contact 133 adapted to engage yielding contacts 134 carried by a contact member 135 insulated from and supported on a post or stud 136 secured in the casing. The two contacts 134 are separated from each other and are connected in the circuit as will later appear. The lower end of the insulating tube 130 carries another bridging contact 137 adapted to engage yielding contacts 138 carried by a contact member 139 insulated from and supported on a stud 140. These two contacts 138 are also in the electric circuit and the function of these contacts, as well as the contacts 134, will appear in a description of the wiring diagram, it being sufficient here to say that when the rod 128 is moved downwardly the circuit is completed from one contact 134 to the other, this being the position of the parts shown in Fig. 14, and when said rod is moved upwardly, the circuit is completed from the contact 138 to the other.

The rod 128 above the casing 126 is provided with a clevis 141 which in turn is connected to a rod 142 provided at its upper end with a clevis 143. This clevis 143 is pivotally connected to one arm 144 of a bell crank lever mounted upon a stud 145 secured in the frame. The other arm 146 of this bell crank lever is connected intermediate its ends to a clevis 147 secured to a push rod 148 extending horizontally out at the front end of the machine where it is provided with a hand button 149. The front end of this rod is supported by a bracket 150 secured to the table 8. The upper end of arm 146 of the bell crank lever is provided with a pin 151 to which is connected one end of a coil spring 152, the other end of said spring being connected to a pin 153 mounted in an arm 154 fixed to the stud 145, as clearly shown in Fig. 12.

It will be seen from the foregoing that with the parts in the position shown in Fig. 1 the tendency of the spring 152 will be to move the two arms of the bell crank lever in a counter-clockwise direction, causing the contacts in the switch box 126 to assume the position in which they are shown in Fig. 14, to wit, with contact 133 bridging contacts 134. When the operator pulls upon the button 149, however, and moves this bell crank lever in a clockwise direction until the spring 152 is passed the center, then this spring tends to hold the switch in the other position, to wit, with contact 137 bridging contacts 138. This operator-operated main line switch is for controlling the opening and closing of the press, as will appear more fully from the wiring diagram.

In the circuit to the motor there is a third switch or the one designated as the emergency controlling device, said device being associated with the head and including the following mechanism:

The steam connection 14 shown in Fig. 6, which is like many of the devices utilized in a press of this kind, is located at the pivot of the head lever 9, being spaced from said pivot by a suitable shank 155. Clamped to this shank 155 by the clamping members 156 and 157 is a substantially U-shaped bracket 158. Secured to this bracket 158 is an emergency control switch box 159 provided with a transversely disposed sliding rod 160 passing across the box in a plane cutting the pivot of the head lever. Within the box said rod is provided with a thrust washer 161 adapted to be engaged by a spring 162 surrounding the rod and thrusting at its other end against a suitable bearing 163 surrounding said rod and suitably supported in said box. Said rod is also provided with a slot 164 shown in dotted lines in Fig. 3 in which slot engages a pin 165 arranged in the two upper arms 166 of a lever 167 pivoted at 168 in said switch box. The two sides of said lever form a clamp at the lower end for receiving an insulating sleeve 169 surrounding the shank 170 of a contact post 171, which is clamped in position by a nut 172. Suitable insulating washers 173 are arranged between the post and the lever. Swivelled on the end of the post is a bridging contact 174 having a pair of contacts adapted to engage a pair of stationary contacts 176 clamped upon and insulated from a square supporting post 177 secured in the switch box.

Surrounding the shank 155 is a switch operating member 178 provided with a slot 179 which permits said member to move endwise upon the shank 155. Said member is provided with extensions 180 provided with arcuate slots 181, the radii of which coincide with the major axis of the slot 179 and the centers of the radii of these slots coinciding with the center of the shank 155 when it occupies a position in the slot 179, as shown in Fig. 3. The reason for this arrangement is based upon the fact that member 178 is not always operated, in fact, is operated only in emergency cases as will later appear. It moves with the head and its lever 9 and therefore must not operate or influence the rod 160 during the normal operation and it is only the forward movement of this member 178 which causes operation of the rod 160. Movement of the member 178 is transmitted to the rod through a roller 182 secured in a clevis 183 on the forward end of rod 160, said roller being mounted on a pin 184, engaging in the slots 181. Secured in alignment with the major axis of the slot 179 is a forwardly extending threaded shank 185 provided with a clevis 186 at its forward end. This clevis is pivotally connected to an arm 187 which is rigidly secured to the back cross arm guard supporting member 188. This cross arm member is provided with a pair of rearwardly extending supporting portions 189 in transverse alignment. Said supporting portions are pivotally mounted upon pins 190 adjustable vertically in slots 191 in clamps 192, secured to the steam pipes 12 and 13 as they enter the head lever, as clearly shown in Fig. 3. The cross arm member 188 is provided with downwardly extending guard holder brackets 193 at the rear of the head 11 adapted to receive the guard frame 194. This guard frame is clamped against the brackets 193 by a suitable securing member 194ª secured in place in any suitable manner. Extending forwardly from the cross member 188 are a pair of spacing arms 195 extending to the front of the head and provided with extending guard receiving portions 196, Fig. 6, to which the guard is clamped by means of clamping members 197. The guard frame and the guard are so supported upon the head, that the lower edge of the guard precedes the head in its downward movement, whereby the guard will engage the arm or hand of the operator before the head is in dangerous range of the bed or support. This engagement causes a rocking of the guard and frame in a counter-clockwise direction with respect to the head and this motion is transmitted to the arm 187, to switch operating member 178 and thence to the rod or bar 160 with the result that the lever 167 is swung in a clockwise direction and the contacts in the main line circuit are broken, thus stopping the motor and arresting the movement of the head until the operator removes her arm or hand when the guard will be restored and closing of the press will be continued.

In order to understand the operation of the controls, reference may be had to the wiring diagram shown in Fig. 8 in which 198 and 199 represent the main lines and 200 an ordinary snap or other switch. This switch, which forms no part of this invention, is entirely separate and has not been previously referred to. Leading from this switch the line 198 is connected to the motor 59, the circuit 201 of which leads through the coil 80 of the brake. Current then passes through the line 202 to one contact 176, to the other contact 176 and to the line 203 thence to one of the pair of contacts 138 of the main line switch. Leading from this same contact 138 is another line 204 leading to one of the pair of contacts 134. The other line 199 leads to the brush or shoe 109 from whence it may lead to either the contact segment 95, as shown in Fig. 8, or the contact segment 105. The contact segment 95 is connected by a line 205 to the other contact 138 while the contact segment 105 is connected by a line 206 to the other contact 134.

When the parts are in the position shown in Fig. 8, the press is open and the motor is idle by reason of the fact that the shoe 109 is in contact with the contact segment 95 which is connected to the contact 138 which is, at this particular time, out of contact with its bridging contact 137. When the operator wishes to close the press, button 149 is pulled forwardly with the result that the circuits through the contacts 134 are broken and a circuit is established through the contacts 138 by the bridging contact 137. This completes the circuit through the lower segment 95 and the motor is started, current to the motor, however, releasing the brake. When the closing cycle has been completed the shoe 109 drops off of segment 95 and onto the segment 105 but this segment is cut out by its contact 134 not being bridged by the bridging contact 133. The press therefore comes to a state of rest in closed position. If during the closing operation, the hand or arm of the operator should be between the pressing members, the guard would be arrested in its downward movement which produces an opening of the emergency switch and a breaking of the circuit to the motor at the contacts 176. When the operator's hand is removed and the guard is restored to normal position the circuit is re-established and the closing part of the cycle is completed. The reverse or opening operation is obvious, it being only important to note that the brake is released every time the circuit to the motor is completed.

What I claim is:

1. In a garment press, a frame, a stationary pressing member, a movable pressing member, power means effective upon said movable pressing member, a circuit to said power means, a time switch in said circuit and controlled by said power means, a selective control in said circuit for operation by the operator, and an emergency switch also arranged in said circuit and having an operator operated part close to and co-extensive with the front margin of the upper pressing member and extending below the same and outside of the margin of the lower pressing member.

2. A garment pressing machine, comprising a frame, relatively movable pressing members, means including a pair of toggle members and adapted when actuated to effect engagement and disengagement of said pressing members and the production of ironing pressure therebetween, means for actuating said first named means, a link pivoted to said frame and to one of said toggle members and adapted for emergency actuation to effect disengagement of said pressing members, said link remaining inactive during normal operation of said first named means, and means for actuating said link.

3. A garment pressing machine, comprising a frame, relatively movable pressing members, means including a pair of toggle members and adapted when actuated to effect engagement and disengagement of said pressing members and the production of ironing pressure therebetween, means for actuating said first named means, a link pivoted to said frame and forming a supporting pivot for one of said toggle members, said link being adapted for emergency actuation to effect disengagement of said pressing members, said link remaining inactive during normal operation of said first named means, and means for actuating said link.

4. A garment pressing machine, comprising a frame, relatively movable pressing members, means including a pair of toggle members and adapted when actuated to effect engagement and disengagement of said pressing members and the production of ironing pressure therebetween, means for actuating said first named means, a link pivoted to said frame and to one of said toggle members and adapted for emergency actuation to effect disengagement of said pressing members, said link remaining inactive in a predetermined position during normal operation of said first named means, means for maintaining said link in said predetermined position during such period of inactivity, and means for actuating said link.

5. A garment pressing machine, comprising a frame, relatively movable pressing members, means including a pair of toggle members and adapted when actuated to effect engagement and disengagement of said pressing members and the production of ironing pressure therebetween, means for actuating said first named means, a link pivoted to said frame and to one of said toggle members and adapted for emergency actuation to effect disengagement of said pressing members, said link remaining inactive in a substantially upright position during normal operation of said first named means, means carried by said link and engaging said frame for maintaining said link in such upright position during such period of inactivity, and means for actuating said link.

6. A garment pressing machine, comprising a frame, relatively movable pressing members, means including a pair of toggle members and adapted when actuated to effect engagement and disengagement of said pressing members and the production of ironing pressure therebetween, means for actuating said first named means, a link pivoted to said frame and to one of said toggle members and adapted for emergency actuation to effect disengagement of said pressing members, said link remaining inactive during normal operation of said first named means, and treadle mechanism for actuating said link.

7. A garment pressing machine, comprising a frame, relatively movable pressing members, means including a pair of toggle members and adapted when actuated to effect engagement and disengagement of said pressing members and the production of ironing pressure therebetween, means for actuating said first named means, a link pivoted to said frame and to one of said toggle members and adapted for emergency actuation to effect disengagement of said pressing members, said link remaining inactive during normal operation of said first named means, and mechaanism for actuating said link and including a treadle pivoted to said frame and a rod connected to said link and normally engaging said treadle below the pivot thereof.

8. A garment pressing machine, comprising a frame, relatively movable pressing members, means including a pair of toggle members and adapted when actuated to effect engagement and disengagement of said pressing members and the production of ironing pressure therebetween, means for actuating said first named means, a link pivoted to said frame and to one of said toggle members and adapted for emergency actuation to effect disengagement of said pressing members, said link remaining inactive during normal operation of said first named means, and mechanism for actuating said link and including a treadle pivoted to said frame and having a slotted arm movable therewith and a rod connected to said link and provided with a pin traveling and confined within said slot and normally engaging said treadle arm below the pivot of said treadle.

9. A garment pressing machine, comprising a frame, relatively movable pressing members, means including a pair of toggle members and adapted when actuated to effect engagement and disengagement of said pressing members and the production of ironing pressure therebetween, means for actuating said first named means, a link pivoted to said frame and to one of said toggle members and adapted for emergency actuation to effect disengagement of said pressing members, said link remaining inactive in a predetermined position during normal operation of said first named means, means for maintaining said link in said predetermined position during such period of inactivity, and mechanism for actuating said link and including a treadle pivoted to said frame and a rod connected to said link and normally engaging said treadle below the pivot thereof whereby movement of said link in either direction is normally resisted.

In testimony whereof I hereby affix my signature.

JOHN P. SINGISER.